United States Patent Office 2,805,311
Patented Sept. 3, 1957

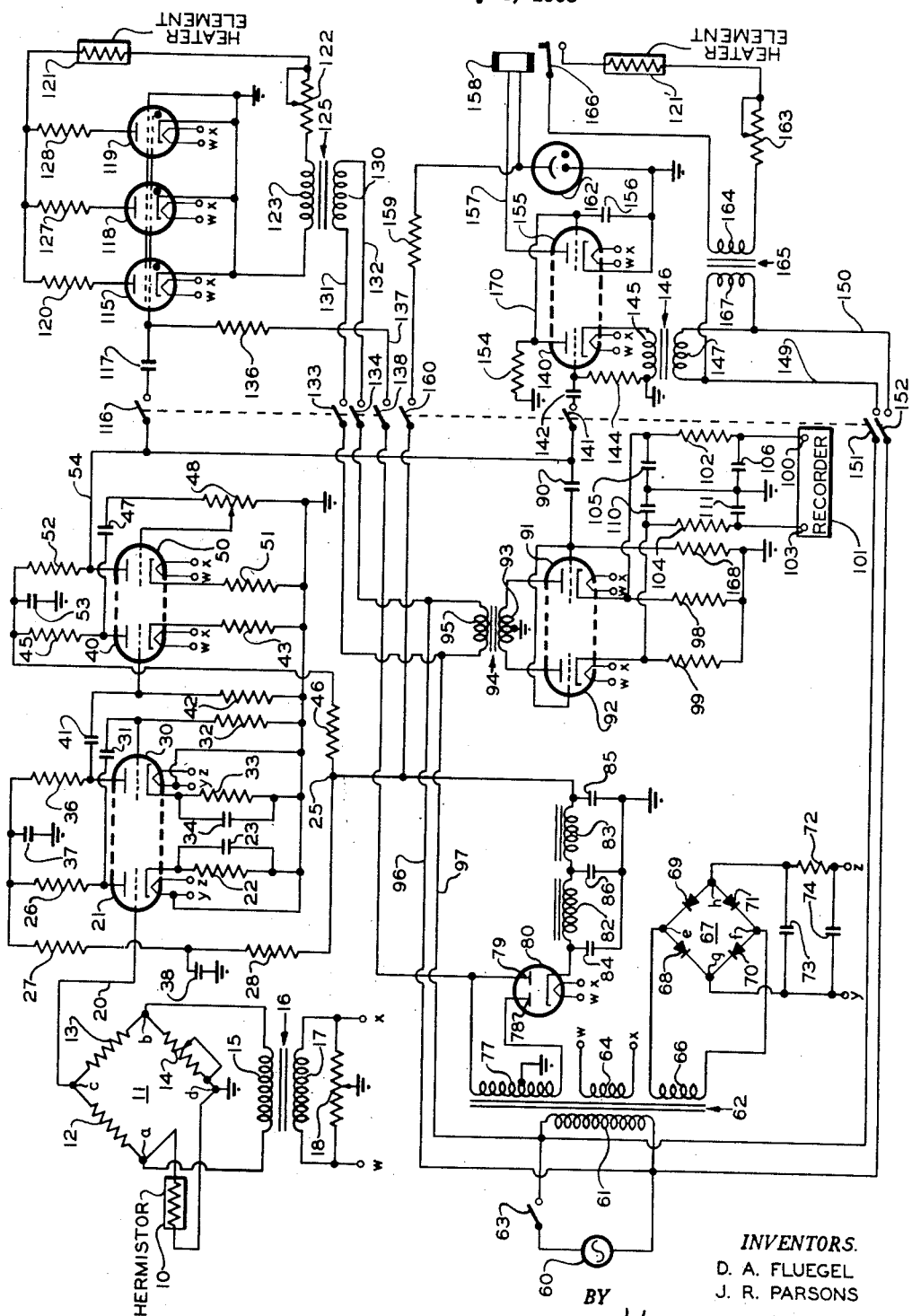

2,805,311

TEMPERATURE MEASUREMENT AND CONTROL

Dale A. Fluegel and James R. Parsons, Bartlesville, Okla., assignors to Phillips Petroleum Company, a corporation of Delaware Application May 4, 1953, Serial No. 352,942

12 Claims. (Cl. 219—20)

This invention relates to temperature measurement and control. In another aspect it relates to apparatus adapted to maintain a constant temperature in a selected region by controlling the heat supplied to or withdrawn from the region.

In various fields of research and industry there is a need for apparatus adapted to maintain constant temperatures in baths, ovens, chemical reactors and the like. Such control apparatus normally employs one or more temperature sensing elements disposed in the region of the temperature to be maintained. The signal obtained from these sensing elements in turn actuates control mechanism to regulate the addition or subtraction of heat from the region of interest to maintain the desired temperature. One particular control system known in the art utilizes a mercury column disposed in the region of interest. The temperature of the region varies the height of the mercury column which is connected electrically through suitable relays to regulate the application of current to a heating element disposed in the temperature region under control. Such a control system, however, is not entirely satisfactory, particularly when sensitive rapid control is needed. This is due to several factors which include: fouling of the mercury surface by sparking, a time lag due to adhesion of the mercury to the contact members, difficulty in adjustment for varying temperatures and the need for the column to be maintained in a generally vertical position.

In accordance with the present invention, there is provided an improved temperature measuring and control system which utilizes as the detecting element a thermally sensitive electrical resistance element, commonly known as a thermistor. This thermistor is connected in one arm of a Wheatstone bridge circuit having an alternating potential applied thereacross. The output signal from the bridge circuit is amplified and applied to a phase-sensitive recorder circuit which provides a continuous indication of the temperature of the region of interest. The amplified output signal from the bridge circuit also is applied independently to a proportional controller circuit utilizing one or more thyratrons which regulate the current supplied to a heater element in response to the magnitude and phase of the output bridge signal. A second form of control circuit is provided which utilizes a single phase-sensitive detector circuit to actuate a relay in response to a temperature deviation of phase indicative of a cooling of the sensing element. The relay in turn controls a circuit connected to a heater element to supply heat to the region of interest whenever the temperature thereof falls below the desired value. The apparatus of this invention thus provides a continuous indication of temperature, and both a proportional and on-off control circuit responsive to temperature deviations.

Accordingly it is an object of this invention to provide improved apparatus for maintaining constant temperature in selected regions and for recording temperatures thereof.

Another object of the invention is to provide temperature control apparatus utilizing a thermistor as the sensing element.

A further object is to provide apparatus for measuring and controlling temperature wherein the metering apparatus is actuated independently of the control apparatus so as to avoid any time lag associated with the control apparatus.

Still another object is to provide apparatus for regulating temperatures which is of rugged construction, reliable in operation, readily adjustable for different temperature ranges and which provides a high degree of sensitivity.

Various other objects, advantages and features should become apparent from the following detailed description of a preferred embodiment of the invention taken in conjunction with the accompanying drawing in which the figure is a schematic representation of the apparatus of this invention.

The illustrated apparatus comprises a thermistor 10 which is adapted to be positioned in the region of temperature to be controlled, which can be a water bath, for example. Thermistor 10 is connected to a Wheatstone bridge circuit 11 to form one arm thereof. Bridge 11 also includes a pair of like resistors 12 and 13 disposed in adjacent arms and a variable resistor 14 disposed in the arm adjacent thermistor 10. A first pair of opposite terminals $a$ and $b$ of the bridge circuit are connected across the end terminals of the secondary winding 15 of a transformer 16. The end terminals of the primary winding 17 of transformer 16 are connected to respective power input terminals $w$ and $x$. The end terminals of a potentiometer 18 are connected across power terminals $w$ and $x$ and the contactor of potentiometer 18 is grounded. The second pair of opposite terminals $c$ and $d$ of bridge 11 form the output terminals of the bridge circuit. Terminal $d$ is grounded and terminal $c$ is connected by a lead 20 to the control grid of a vacuum tube triode 21.

Triode 21 forms the first stage of a four-stage amplifier which is provided to amplify the output signal from bridge circuit 11. The cathode of triode 21 is connected to ground through a resistor 22 which is shunted by a capacitor 23. The anode of triode 21 is connected to a positive potential terminal 25 through series connected resistors 26, 27 and 28 and to the control grid of a second vacuum tube triode 30 through a capacitor 31. The control grid of triode 30 is connected to ground through a resistor 32 and the cathode of triode 30 is connected to ground through a resistor 33 having a capacitor 34 connected in shunt therewith. The anode of triode 30 is connected to positive potential terminal 25 through series connected resistors 36, 27 and 28. The junction between anode resistors 26 and 36 is grounded through a capacitor 37 and the junction between resistors 27 and 28 is grounded through a capacitor 38. The anode of triode 30 also is connected to the control grid of a third vacuum tube triode 40 through a capacitor 41. The control grid of triode 40 is connected to ground through a resistor 42 and the cathode of triode 40 is connected to ground through a resistor 43. The anode of triode 40 is connected to positive potential terminal 25 through series connected resistors 45 and 46 and to ground through a capacity 47 and a potentiometer 48, the end terminals of the latter being connected in series with capacitor 47. The contactor of potentiometer 48 is connected to the control grid of a fourth vacuum tube triode 50. The cathode of triode 50 is connected to ground through a resistor 51 and the anode of triode 50 is connected to positive potential terminal 25 through series connected resistors 52 and 46, the junction between anode resistors 45 and 52 being grounded through a capacitor 53. A lead 54 is connected to the anode of triode 50 and provides one output terminal of the amplifier unit, the second output terminal of which is represented by ground.

Operating potentials for the bridge circuit, the amplifier and the remainder of the apparatus associated therewith are provided by a power supply circuit which is energized from a source of alternating potential 60, the output terminals of which are connected across the primary winding 61 of a transformer 62 through a switch 63. A first secondary winding 64 of transformer 62 supplies a source of alternating potential to energize the Wheatstone bridge circuit as well as the heated filaments of triodes 40 and 50. The end terminals of transformer winding 64 are designated by letters $w$ and $x$ to indicate direct connections, not shown, to winding 17 of transformers 16 as well as to the filaments of triodes 40 and 50. A second secondary winding 66 of transformer 62 is applied across first opposite terminals of a rectifier bridge circuit 67 having four rectifiers 68, 69, 70 and 71 connected in the respective arms thereof. The end terminals of transformer windings 66 are connected to the bridge terminals $e$ and $f$ between rectifiers 68 and 69 and between rectifiers 70 and 71, respectively. A bridge terminal $g$ between rectifiers 68 and 70 is connected to a first output terminal $y$ and the bridge terminal $h$ between rectifiers 69 and 71 is connected to a second output terminal $z$ through a resistor 72. A first capacitor 73 is connected across bridge terminals $g$ and $h$ and a second capacitor 74 is connected across output terminals $y$ and $z$. Resistor 72 and capacitors 73 and 74 thus provide a filter circuit to remove the A.-C. component of the rectifier output. This voltage is applied to the filaments of triodes 21 and 30. A third center-tapped secondary winding 77 is provided on transformer 62. The center tap of winding 77 is grounded and the two end terminals thereof are connected to respective anodes 78 and 79 of a double diode 80. The cathode of diode 80 is connected to potential terminal 25 through a pair of series connected inductors 82 and 83. The junction between the cathode of diode 80 and inductor 82 is grounded through a capacitor 84; the junction between inductor 83 and terminal 25 is grounded through a capacitor 85; and the junction between inductors 82 and 83 is grounded through a capacitor 86. Inductors 82 and 83 and capacitors 84, 85 and 86 thus form a filter circuit whereby a steady positive potential is maintained at terminal 25 to supply positive operating potentials for triodes 21, 30, 40 and 50 of the amplifier circuit. The filament of diode 80 is connected across terminals $w$ and $x$ of transformer winding 64.

The output terminal 54 of the amplifier circuit is connected through a capacitor 90 to the control grids of a pair of vacuum tube triodes 91 and 92 which constitute a phase sensitive detector, these control grids being connected to ground through a resistor 168. The anodes of triodes 91 and 92 are connected to the respective end terminals of a center-tapped secondary transformer winding 93 of transformer 94, the center tap of winding 93 being grounded. The end terminals of the primary winding 95 of transformer 94 are connected across voltage source 60 by leads 96 and 97. The cathode of triode 91 is connected to ground through a resistor 98 and the cathode of triode 92 is connected to ground through a resistor 99. Heater current for the filaments of triodes 91 and 92 is supplied by winding 64 of transformer 62. The cathode of triode 91 is connected to a first input terminal 100 of a recorder 101 through a resistor 102 and the cathode of triode 92 is connected to the second input terminal 103 of recorder 101 through a resistor 104. A capacitor 105 is connected between ground and the junction between the cathode of triode 91 and resistor 102, and a capacitor 106 is connected between ground and input terminal 100 of recorder 101. Resistor 102 and capacitors 105 and 106 form a first filter circuit whereby fluctuating potentials on the cathode of triode 91 are applied to terminal 100 as steady potentials. A capacitor 110 is connected between ground and the junction between the cathode of triode 92 and resistor 103 and a capacitor 111 is connected between ground and input terminal 103 of recorder 101. Resistor 103 and capacitors 110 and 111 form a second filter circuit whereby fluctuating potentials on the cathode of triode 92 are applied to terminal 103 as steady potentials. The potential difference between the intput terminals of recorder 101 is thus representative of the difference in average potentials appearing on the cathodes of triodes 91 and 92.

Output terminal 54 of the amplifier unit also is applied to the control grid of a first gas-filled tetrode 115 through a switch 116 and a capacitor 117. The control grid of tetrode 115 is connected to the control grid of a second like tetrode 118 and to the control grid of a third like tetrode 119. Gas-filled tetrodes 115, 118 and 119 are known generally in the art as thyratrons and will be so referred to hereinafter. The cathodes of thyratrons 115, 118 and 119 are grounded as are the suppressor grids of each of these thyratrons. The anode of thyratron 115 is connected to ground through an anode resistor 120, a heater element 121, a variable resistor 122, and the secondary winding 123 of a transformer 125, these four circuit components being connected in series relation. The anode of thyraton 118 is connected to ground through an anode resistor 127, heater element 121, resistor 122 and transformer winding 123; and the anode of thyratron 119 is connected to ground through an anode resistor 128, heater element 121, resistor 122 and transformer winding 123. The end terminals of the primary winding 130 of transformer 125 are connected across voltage source 60 by leads 131 and 132 which have respective switches 133 and 134 connected therein. The interconnected control grids of the three thyratrons 115, 118 and 119 are connected to the anode 79 of diode 80 in the power supply circuit through a grid resistor 136 and a lead 137 having a switch 138 connected therein. Switches 116, 133, 134 and 138 are coupled mechanically such that the proportional control unit containing the three thyratrons can be connected to the amplifier output and the power supply circuit as desired. The filaments of the three thyratrons are connected across transformer winding 64 of transformer 62.

Output terminal 54 of the amplifier unit also is connected to the control grid of a vacuum tube triode 140 through a switch 141 and a capacitor 142. The control grid of triode 140 is connected to ground through a resistor 144. The secondary winding 145 of a transformer 146 is connected between cathode of triode 140 and ground. The end terminals of the primary winding 147 of transformer 146 are connected across voltage source 60 by leads 149 and 150 having respective switches 151 and 152 connected therein. The anode of triode 140 is connected to ground through a resistor 154 and directly to the control grid of a second vacuum tube triode 155 by a lead 170. The control grid of triode 155 is connected to ground through a capacitor 156 and the cathode of triode 155 is connected directly to ground. The anode of triode 155 is connected by a lead 157 to one terminal of the operating coil of a relay 158. The second terminal of the coil of relay 158 is connected to positive potential terminal 25 through a resistor 159 and a switch 160. The junction between the second terminal of the coil of relay 158 and resistor 159 is connected to the anode of a gas-filled voltage regulating tube 162, the cathode of which is grounded. A second heater element 121' is connected in series relation with a variable resistor 163, the secondary winding 164 of a transformer 165 and a switch 166 which is actuated by relay 158. The primary winding 167 of transformer 165 is connected across power leads 149 and 150. Switch 166 normally remains in an open position but is closed by the absence of current through the relay 158 whereby current from transformer 165 is applied to heater element 121'.

The operation of the described apparatus should readily become apparent to one skilled in the art. The bridge circuit 11 is balanced initially by adjustment of resistor 14 until there is zero potential difference between terminals c and d with thermistor 10 being maintained at the desired temperature. This condition is readily obtained by constructing the bridge with equal-valued resistors 12 and 13 and adjusting the contactor of potentiometer 18 until a symmetrical voltage signal is applied across the bridge. Under this condition the output signal from the amplifier unit remains zero or constant at a predetermined value. The detector circuit associated with triodes 91 and 92 is constructed such that the two circuits associated with the two triodes are identical. Since the anodes of the two triodes are connected to respective end terminals of transformer winding 93, the anode of triode 91 is maintained at a positive potential at such time as the anode of triode 92 is at a negative potential, and vice versa. Under this condition any conduction through either one of the tubes during the half cycle of applied voltage when the anode thereof is positive will be matched by an equal conduction through the other tube during the following half cycle when the anode of said second tube is positive. These equal current flows through the two triodes result in equal potentials being applied to the two input terminals of recorder 101 such that the potential difference therebetween remains zero which indicates the temperature of thermistor 10 is at the desired value.

If the temperature in the region of thermistor 10 should increase, the resistance of the thermistor changes so as to increase or decrease, depending upon whether the thermistor has a positive or negative coefficient of thermal resistivity. In either event the symmetry of bridge circuit 11 is destroyed which results in a definite potential being applied to the control grid of triode 21. This input potential is amplified by the four-stage amplifier, the gain of which is regulated by potentiometer 48, such that the output potential at terminal 54 is in phase with the potential at terminal c of bridge 11. By careful construction of the amplifier unit the output signal therefrom remains substantially in phase with the input signal thereto, which signal, in turn, is either in phase or 180° out of phase with the supply voltage 60. Any amplifier output signal thus applied to the control grids of the two triodes 91 and 92 is either in phase or 180° out of phase with the voltages appearing on the respective anodes thereof. If, for example, the voltage applied to the control grid of triode 91 is in phase with the voltage on the anode of triode 91, the current flow through the tube is increased over the current flow with zero voltage being applied to the control grid thereof such that the potential applied to input terminal 100 of recorder 101 is greater than the potential so applied with a zero signal voltage on the control grid of triode 91. During the second half cycle of applied voltage the anode of triode 92 becomes positive, whereas the potential appearing on the control grid of triode 92 is 180° out of phase with the anode potential such that the current flow through the tube is less than the current flow through this tube with a zero grid signal. This results in a voltage of lesser magnitude being applied to the second input terminal 103 of recorder 101. The resulting difference in potential applied to the input terminals of recorder 101 provides an indication of the change in resistivity of thermistor 10, which in turn is indicative of the temperature change thereof. An increase in temperature of thermistor 10 above the initial value results in a signal of first phase being applied to the input of the amplifier whereas a decrease in temperature of thermistor 10 results in a signal being applied to the input of the amplifier which is 180° out of phase of the first-mentioned signal. Accordingly, the difference in potential applied to recorder 101 is indicative both of the degree of temperature change of thermistor 10 and the direction of change. In a preferred embodiment of this invention, thermistor 10 is constructed of a semiconducting material such as uranium oxide or silver sulphide, for example. Such semiconducting materials have high negative temperature coefficients of resistivity.

The three thyratrons 115, 118 and 119 are biased initially such that none conducts in the absence of a positive potential being applied to the control grid thereof. It should be noted that the potential applied to the anodes of these thyratrons is supplied by transformer 125 which is connected across voltage source 60. The phase relation between the output signal from the amplifier unit and the anode potential on the three thyratrons is set such that a decrease in temperature of thermistor 10 below the desired value results in a positive output signal from the amplifier unit being applied to the control grid of the three thyratrons in phase with the positive potential being applied to the anodes thereof. The magnitude of this grid potential determines the phase at which the three thyratrons begin to conduct with the result that the current passed through heater element 121 is of duration proportional to the magnitude of the temperature deviation of thermistor 10. This provides a proportional control in that the heat supplied to the region under measurement is proportional to the temperature drop below the desired value in the region. Current flow through element 121 can be varied by resistor 122. Obviously, more or less than three thyratrons can be employed in parallel relation depending upon the desired current flow through heater element 121.

The on-off control unit is adapted to supply heater current through element 121' whenever the temperature of thermistor 10 falls below the predetermined value. The phase relationship between the voltage applied through transformer 146 and the output signal from the amplifier unit is such that the control grid of triode 140 is supplied with a positive signal potential at such time as the cathode of triode 140 is negative with respect to the control grid. This results in conduction through triode 140, which decreases the potential on the anode thereof. This decrease in potential is applied to the control grid of triode 155 such that triode 155 becomes non-conductive to de-energize relay 158 to closed switch 166 to allow heater current to flow through element 121'. The bias on the relay is such that switch 166 remains closed as long as an input signal of proper phase is applied to the control grid of triode 140; that is, relay 158 does not change position at the frequency of voltage source 60. The amount of current passed through element 121' can be varied by adjustment of resistor 163.

In one specific embodiment of this invention excellent results were obtained with the following component values: resistors 12, 13 and 18, 1000 ohms each; resistor 14, 5000 ohms; resistors 26, 36, 45, 52, 98, 99 and 154, 180,000 ohms each; resistors 22 and 33, 1800 ohms; resistors 27 and 28, 39,000 ohms, resistors 32, 42 and 168, 1,000,000 ohms; resistor 136, 33,000,000 ohms; resistors 121 and 121', 500 ohms; resistors 122 and 163, 1500 ohms; potentiometer 48, 1,000,000 ohms; capacitors 23 and 34, 50 microfarads each; capacitors 37 and 38, 10 microfarads each; capacitors 31, 41, 47, 90 and 142, 0.1 microfarad each; capacitors 105, 106, 110 and 111, 2 microfarads each; capacitors 84, 85 and 86, 10 microfarads each; capacitors 73 and 74, 1000 microfarads each. Triodes 21 and 30 are contained in a double tube type 12AX7; triodes 40 and 50 are contained in a double tube type 12AX7; triodes 91 and 92 are contained in a double tube type 12AU7; and triodes 140 and 155 are contained in a double tube type 12AU7. Thyratrons 115, 118 and 119 were each tubes type 2D21. Double rectifier tube 80 was type 6X4. Voltage regulating tube 162 was type OA2. Thermistor 10 was a glass enclosed bead thermistor type 14B manufactuered by Western Electric Company and resistors 12, 13 and 15 were constructed of manganin wire which had a temperature coefficient of resistivity such as to require an 80° F. temperature change to produce a resistance change equivalent to that produced in the sensing thermistor 10 by a temperature change of 0.004° F.

With the use of the foregoing on-off relay control apparatus the temperature of an insulated agitated water bath of one liter volume was held constant within ±0.004° F. at 100° F. for a period of 24 hours. The temperature change required to actuate the heater relay 158 was only 0.00033° F. When the proportional controller utilizing thyratrons 115, 118 and 119 was employed the temperature of the same water bath was held constant within ±0.001° F. at 100° F.

From the foregoing description of a preferred embodiment of this invention it should readily be apparent that there is provided an extremely accurate temperature measurement and control system utilizing a thermistor as the temperature sensing element. While this invention has been described in conjunction with a present preferred embodiment, it should be apparent that the invention is not limited thereto.

What is claimed is:

1. A temperature measuring system comprising a thermistor adapted to be disposed in a region of temperature to be measured; a Wheatstone bridge circuit having said thermistor disposed in one arm thereof and balancing resistors disposed in remaining arms thereof; a source of alternating potential; means applying said source across a first pair of terminals of said bridge circuit; an amplifier having the input terminals thereof connected across a second pair of terminals of said bridge circuit so that temperature variations of said thermistor result in variance of the resistance of said thermistor which results in variance of the signal applied to the input terminals of said amplifier; a phase sensitive detector circuit comprising first and second electron tubes each having an anode, a cathode and a control grid, a first resistor having one terminal connected to the cathode of said first tube, a second resistor having one terminal connected to the cathode of said second tube, the second terminals of said first and second resistors being connected to one another, a transformer, means applying said source of potential across the primary winding of said transformer, means connecting a point on the secondary winding of said transformer to the second terminals of said first and second resistors, a first filter circuit having its input terminals connected to the respective end terminals of said first resistor, a second filter circuit having its input terminals connected to the respective end terminals of said second resistor, and means to indicate the difference between the output voltages of said first and second filter circuits; and means connecting the first output terminal of said amplifier to the control grids of said tubes and the second output terminal of said amplifier to the second terminals of said first and second resistors.

2. The combination in accordance with claim 1 further comprising means independent of said detector circuit to supply heat to the region of said thermistor responsive to the output signal of said amplifier.

3. The combination in accordance with claim 2 wherein said means to supply heat comprises a gas-filled tube having at least an anode, a cathode and a control grid, a heating element, a second transformer, means applying said source of potential across the primary winding of said second transformer, means connecting said heating element and the secondary winding of said second transformer in series between the anode and cathode of said gas-filled tube, and means connecting the output terminals of said amplifier to the control grid and cathode of said gas-filled tube, respectively.

4. The combination in accordance with claim 2 wherein said means to supply heat to the region of said thermistor comprises a third electron tube having at least an anode, a cathode and a control grid, means for applying said potential between the cathode and control grid of said third tube, means for applying the output signal from said amplifier to the control grid of said third tube, a relay connected in the output circuit of said third tube, and a heating element connected in circuit with the contacts of said relay and said source of potential whereby said relay is energized by the output signal of said third tube.

5. A temperature measuring system comprising a thermistor adapted to be disposed in the region of temperature to be measured; a bridge circuit having said thermistor disposed in one arm thereof; a source of alternating potential applied across a first pair of terminals of said bridge circuit; an amplifier, the input terminals of said amplifier being connected across a second pair of terminals of said bridge circuit whereby temperature variations of said thermistor result in variance of the resistance of said thermistor which results in variance of the signal applied to the input terminals of said amplifier; a phase sensitive detector circuit comprising first and second electron tubes each having at least an anode, a cathode and a control grid, means for applying said source of potential to the respective anodes of said first and second tubes so that the potentials applied to the anodes of said two tubes are 180° out of phase with one another, means for applying the output signal from said amplifier to the control grids of each of said tubes, and means for measuring the differences in conduction through said two tubes which are indicative of the temperature of said thermistor.

6. The combination in accordance with claim 5 further including means for maintaining a predetermined temperature in the region of said thermistor which comprises a gas-filled electron tube having at least an anode, a cathode and a control grid, means for applying said source of potential between the anode and cathode of said gas-filled tube, means for applying the output signal from said amplifier to the control grid of said gas-filled tube, and means for regulating the heat supplied to the region of said thermistor in accordance with the magnitude of current flow through said gas-filled tube.

7. The combination in accordance with claim 6 wherein said means for regulating said heat comprises an electrical heating element connected in series relation with said gas-filled tube and said source of potential whereby the current flow through said gas-filled tube flows through said heating element.

8. The combination in accordance with claim 5 further including means for maintaining a predetermined temperature in the region of said thermistor which comprises a third electron tube having at least an anode, a cathode and a control grid, means for applying said potential between the cathode and control grid of said third tube, means for applying the output signal from said amplifier to the control grid of said third tube, and means for regulating the heat supplied to the region of said thermistor in accordance with the output signal from said third tube.

9. The combination in accordance with claim 8 wherein said means for regulating said heat comprises a relay connected in the output circuit of said third tube, and a heating element connected in circuit with the contacts of said relay and said source of potential whereby said relay is energized by the output signal of said third tube.

10. A temperature measuring and control system comprising a thermistor having a negative coefficient of thermal resistivity adapted to be disposed in the region of temperature under control; a Wheatstone bridge circuit having said thermistor disposed in one arm thereof and balancing resistors disposed in the remaining arms thereof; a source of alternating potential applied across a first pair of terminals of said bridge circuit; a multi-stage electron tube amplifier, the input terminals of said amplifier being connected across a second pair of terminals of said bridge circuit whereby temperature variations of said thermistor result in variance of the signal applied to the input terminals of said amplifier, the output signal of said amplifier being in phase with the input signal to said amplifier, there being a 180° phase shift in said signals as the temperature of said thermistor varies above and below a predetermined value; a phase sensitive detector circuit comprising first and second electron tubes each having an anode, a cathode and a control grid, a first cathode resistor connected to the cathode of said first tube, a second cathode resistor connected to the cathode of said second tube, means for applying said source of potential to the respective anodes of said first and second tubes so that the potentials applied to the anodes of said two tubes are 180° out of phase with one another, means for applying the output signal from said amplifier to the control grids of each of said tubes, a first filter circuit having its input terminals connected across said first cathode resistor, a second filter circuit having its input terminals connected across said second cathode resistor, means to indicate the potential difference between the output voltages of said filter circuits which is indicative of the temperature of said thermistor, and means independent of said detector circuit for regulating the heat supplied to the region of said thermistor in accordance with the output signal of said amplifier.

11. The combination in accordance with claim 10 wherein said means for regulating the heat supplied to the region of said thermistor comprises a gas-filled electron tube having at least an anode, a cathode and a control grid, means for applying said source of potential between the anode and cathode of said gas-filled tube, means for applying the output signal from said amplifier to the control grid of said gas-filled tube, and an electrical heating element connected in series relation with said gas-filled tube and said source of potential whereby the current flow through said gas-filled tube flows through said heating element.

12. The combination in accordance with claim 10 wherein said means for regulating the heat supplied to the region of said thermistor comprises a third electron tube having at least an anode, a cathode and a control grid, means for applying said potential between the cathode and control grid of said third tube, means for applying the output signal from said amplifier to the control grid of said third tube, a relay connected in the output circuit of said third tube, and a heating element connected in circuit with the contacts of said relay and said source of potential whereby said relay is energized by the output signal of said third tube.

References Cited in the file of this patent

UNITED STATES PATENTS

| | | |
|---|---|---|
| 1,694,264 | Hull | Dec. 4, 1928 |
| 2,275,317 | Ryder | Mar. 3, 1942 |
| 2,439,711 | Bovey | Apr. 13, 1948 |
| 2,467,856 | Rich | Apr. 19, 1949 |
| 2,495,844 | Hornfeck | Jan. 31, 1950 |
| 2,511,981 | Hanchett | June 20, 1950 |
| 2,519,789 | Perkins | Aug. 22, 1950 |
| 2,548,014 | Gealt | Apr. 10, 1951 |
| 2,635,225 | Hadady | Apr. 14, 1953 |